(12) United States Patent
Longenecker et al.

(10) Patent No.: US 8,991,867 B2
(45) Date of Patent: Mar. 31, 2015

(54) BREAK-AWAY BUCKLE FOR A CHILD RESTRAINT

(71) Applicant: Artsana USA, Inc., Lancaster, PA (US)

(72) Inventors: Michael L. Longenecker, Lancaster, PA (US); James M. Dillner, Leola, PA (US)

(73) Assignee: Artsana USA, Inc, Lancaster, PA (US)

( * ) Notice: Subject to any disclaimer, the term of this patent is extended or adjusted under 35 U.S.C. 154(b) by 0 days.

(21) Appl. No.: 14/448,835

(22) Filed: Jul. 31, 2014

(65) Prior Publication Data

US 2015/0054272 A1    Feb. 26, 2015

Related U.S. Application Data (60) Provisional application No. 61/868,524, filed on Aug. 21, 2013.

(51) Int. Cl.
| | | |
|---|---|---|
| B60R 22/00 | (2006.01) | |
| A44B 11/25 | (2006.01) | |
| B60R 22/12 | (2006.01) | |
| B60R 22/32 | (2006.01) | |

(52) U.S. Cl.
CPC ............. *A44B 11/2511* (2013.01); *B60R 22/12* (2013.01); *B60R 22/32* (2013.01)
USPC ............ 280/808; 24/579.11; 24/615; 24/625; 24/630

(58) Field of Classification Search
USPC ............... 280/808; 24/579.11, 614, 615, 616, 24/625, 630, 632, 662
See application file for complete search history.

(56) References Cited

U.S. PATENT DOCUMENTS

| | | | |
|---|---|---|---|
| 3,564,672 A | | 2/1971 | McIntyre |
| 3,767,144 A | | 10/1973 | Gaylord |
| 4,302,049 A | | 11/1981 | Simpson |
| 6,049,954 A | | 4/2000 | Britto |
| 6,161,266 A | | 12/2000 | Anscher |
| 6,360,404 B1 | | 3/2002 | Mudge et al. |
| 6,393,677 B1 | | 5/2002 | Anscher |
| 6,543,101 B2 | | 4/2003 | Sack et al. |
| 7,107,657 B1 | | 9/2006 | Howell |
| 7,117,568 B2 | | 10/2006 | Nolan |
| 7,669,298 B2 | | 3/2010 | Chen |
| 7,712,196 B2 | | 5/2010 | Kawamura et al. |
| 7,770,267 B2 | | 8/2010 | Chen et al. |
| 7,849,571 B2 | | 12/2010 | Chen |
| 8,256,073 B2 | | 9/2012 | Zhang |
| 8,448,308 B2 | | 5/2013 | Mountz et al. |
| 8,683,666 B2 * | | 4/2014 | Miller .............................. 24/633 |
| 2005/0125970 A1 * | | 6/2005 | Nolan .............................. 24/615 |
| 2005/0225157 A1 * | | 10/2005 | Patrizi et al. ................... 297/464 |

(Continued)

*Primary Examiner* — Toan To (57) ABSTRACT

A buckle for a child safety seat comprising a body having an opening for receiving and selectively retaining in position a tang portion of a first belt portion connector, a loop element for connecting a second belt portion, the loop element engaging the tang portion to connect the first and second belt portions, the loop element comprising a base with a pair of legs extending therefrom and abutting at distal ends at a split surface. Each leg includes an anti-spread tab extending generally perpendicularly from the leg configured to engage the opening when the buckle is operably assembled to prevent separation of the split surface and retain the loop element engaged on the tang portion. The anti-separation tabs allow separation of the split surface as the tang is partially withdrawn from the opening so that the lop portion may be disengaged from the tang by movement generally transverse to the tang.

16 Claims, 5 Drawing Sheets

(56) References Cited

U.S. PATENT DOCUMENTS

| | | | |
|---|---|---|---|
| 2006/0168782 A1* | 8/2006 | Pontaoe | 24/614 |
| 2007/0044285 A1* | 3/2007 | Kawamura et al. | 24/633 |
| 2008/0010790 A1* | 1/2008 | Dillner | 24/630 |
| 2012/0110802 A1 | 5/2012 | Zhao | |

* cited by examiner

BREAK-AWAY BUCKLE FOR A CHILD RESTRAINT

CROSS REFERENCE TO RELATED APPLICATIONS

This application claims the benefit of priority of U.S. Provisional Application 61/868,524, filed Aug. 21, 2013.

BACKGROUND OF THE INVENTION

This invention relates generally to children's safety seats for use in vehicles or to conveniently carry a child or infant, and more particularly to a five-point harness or restraint system with an improved buckle that allows shoulder restraint belts to be conveniently detached from the lap belts for improved accessibility and safety.

Restraint belts in child safety seats typically comprise a pair lap belt portions, a crotch belt, and a pair of shoulder belt portions all centrally connected in front of the child's abdomen to hold the child in place. It was at one time common for the lap belt portion and shoulder belt portion on each lateral side to be formed from a continuous loop of belt that is connected to the seat at each end and directed through a tab which engages a centrally positioned buckle typically attached to the crotch belt. Advancement in safety standards necessitated the need to eliminate loops in the safety belts which could pose safety hazards for children when the belts were not in use and potentially inhibit removal of the child from the safety seat in an emergency.

Restraint belt connectors have become increasingly complex as the requirements in the interest of safety have increased. As a result, many buckle designs are somewhat complex and not always as easy to use as might be desired by caregivers struggling to properly secure children in safety seats. It would be advantageous to provide a means for securing the ends of lap and shoulder belts used in child safety seats capable of meeting the necessary safety standards while offering a simple and easy to use way to connect the safety belts.

SUMMARY OF THE INVENTION

Accordingly, the present invention, in any of the embodiments described herein, may provide one or more of the following advantages:

It is an object of the present invention to provide a buckle for a child safety seat harness comprising a buckle body having an opening for receiving and selectively retaining in position a tang portion of a male element, a first belt portion being connected to the male element, a loop element for connecting a second belt portion, the loop element engaging the tang portion to connect the first and second belt portions, the loop element comprising a base with a pair of legs extending therefrom and abutting at distal ends at a split surface. Each leg includes an anti-spread tab extending generally perpendicularly from the leg configured to engage the opening when the buckle is operably assembled to prevent separation of the split surface and retain the loop element engaged on the tang portion.

It is a further object of the present invention to provide a buckle for a child safety seat harness comprising a buckle body having an opening for receiving and selectively retaining in position a tang portion of a male element, a first belt portion being connected to the male element, a loop element for connecting a second belt portion, the loop element engaging the tang portion to connect the first and second belt portions, the loop element comprising a base with a pair of legs extending therefrom and abutting at distal ends at a split surface. Each leg includes an anti-spread tab extending generally perpendicularly from the leg configured to engage the opening when the buckle is operably assembled to prevent separation of the split surface and allow separation of the split surface as the tang is partially withdrawn from the opening.

It is a further object of the present invention to provide a buckle for a child safety seat harness comprising a buckle body having an opening for receiving and selectively retaining in position a tang portion of a male element, a first belt portion being connected to the male element, a loop element for connecting a second belt portion, the loop element engaging the tang portion to connect the first and second belt portions, the loop element comprising a base with a pair of legs extending therefrom and abutting at distal ends at a split surface. Each leg includes an anti-spread tab extending generally perpendicularly from the leg configured to engage the opening when the buckle is operably assembled to prevent separation of the split surface and allow separation of the split surface as the tang is partially withdrawn from the opening. Surface contours on the anti-spread tabs facilitate engagement and disengagement of the loop portion from the tangs.

It is a still further object of the present invention to provide a buckle for a child safety seat five-point harness that includes break-away provisions for the shoulder belt portion from the lap belt portion.

It is a still further object of the present invention to provide a buckle for a child safety seat five-point harness that includes provisions to retain the individual buckle portions in position to ease the engagement of the buckle into an operable configuration.

It is a still further object of the present invention to provide a buckle for a child safety seat five-point harness that is durable in construction, inexpensive of manufacture, carefree of maintenance, easily assembled, and simple and effective to use.

These and other objects are achieved in accordance with the present invention by a buckle comprising a buckle body having an opening for receiving and selectively retaining in position a tang portion of a male element, a first belt portion being connected to the male element, a loop element for connecting a second belt portion, the loop element engaging the tang portion to connect the first and second belt portions, the loop element comprising a base with a pair of legs extending therefrom and abutting at distal ends at a split surface. Each leg includes an anti-spread tab extending generally perpendicularly from the leg configured to engage the opening when the buckle is operably assembled to prevent separation of the split surface and retain the loop element engaged on the tang portion. The anti-separation tabs allow separation of the split surface as the tang is partially withdrawn from the opening so that the lop portion may be disengaged from the tang by movement generally transverse to the tang.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined as a child safety seat would normally rest when in use in a vehicle or on the floor or a similarly level surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
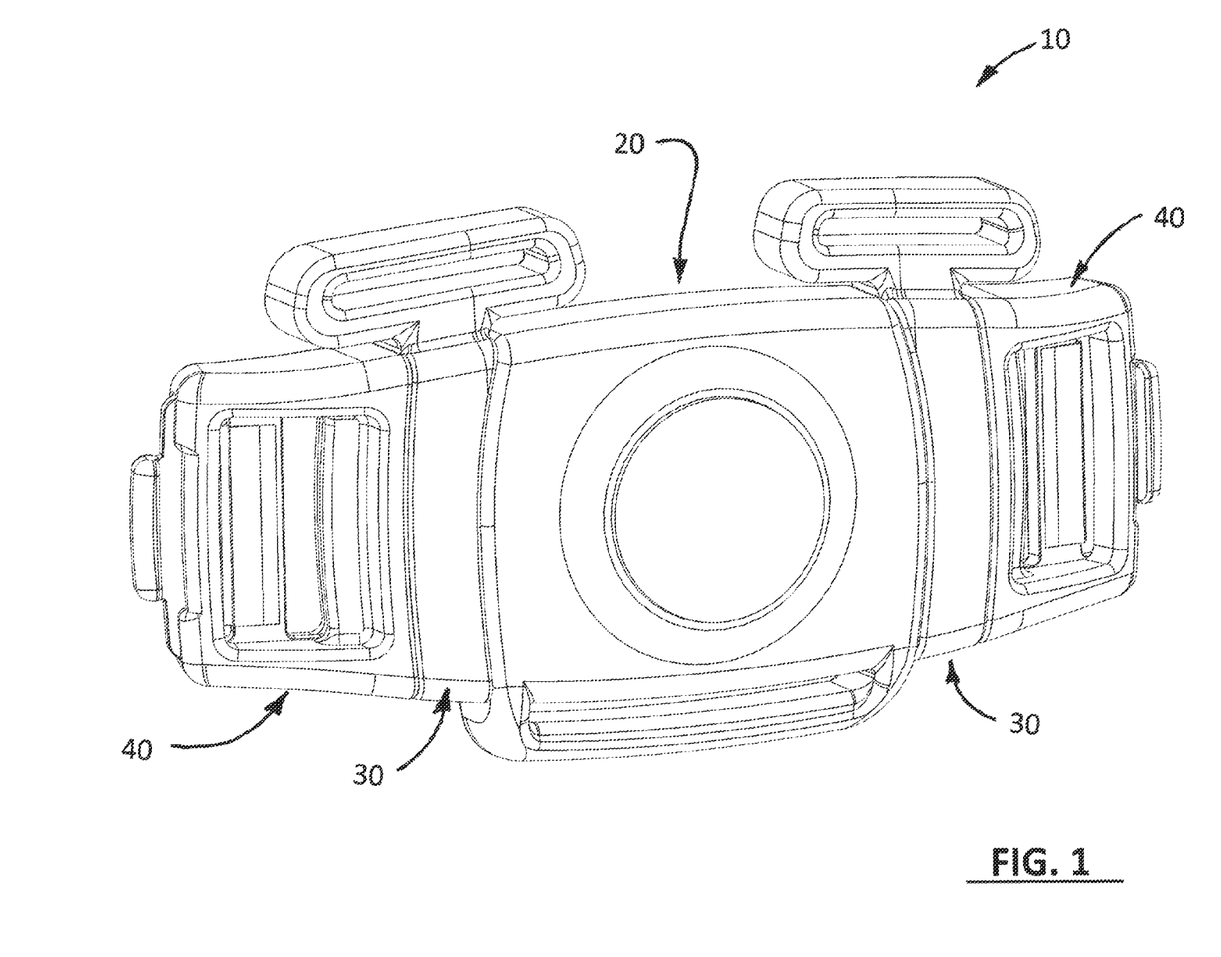
FIG. 1 is a front facing view of a buckle for a five-point harness used in a child safety seat embodying concepts of the present invention shown in a fully connected, operable configuration.
Figure 2:
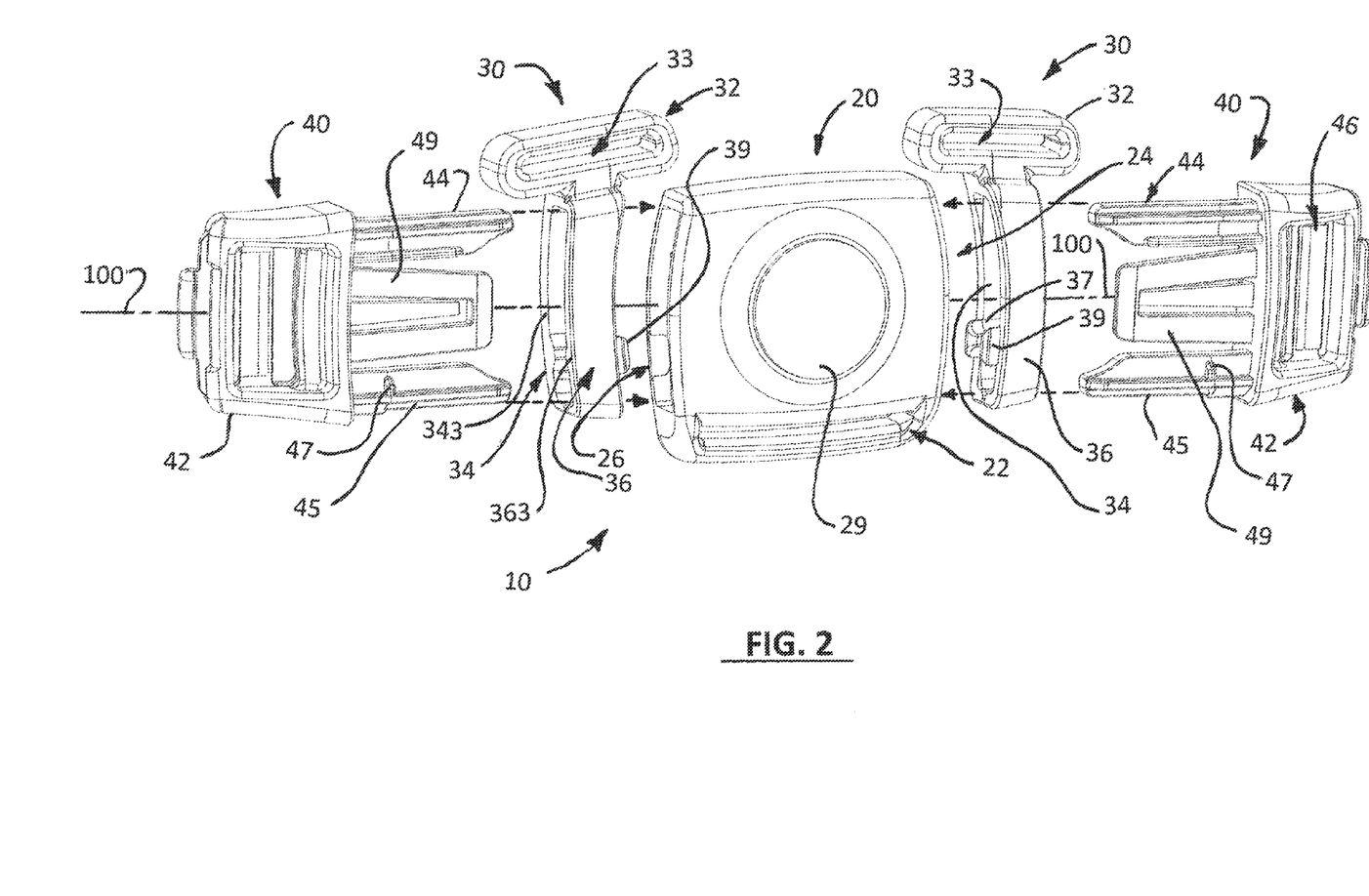
FIG. 2 is a front facing view of the buckle of FIG. 1 with individual elements of the buckle shown disconnected and in a non-operable configuration.
Figure 3:
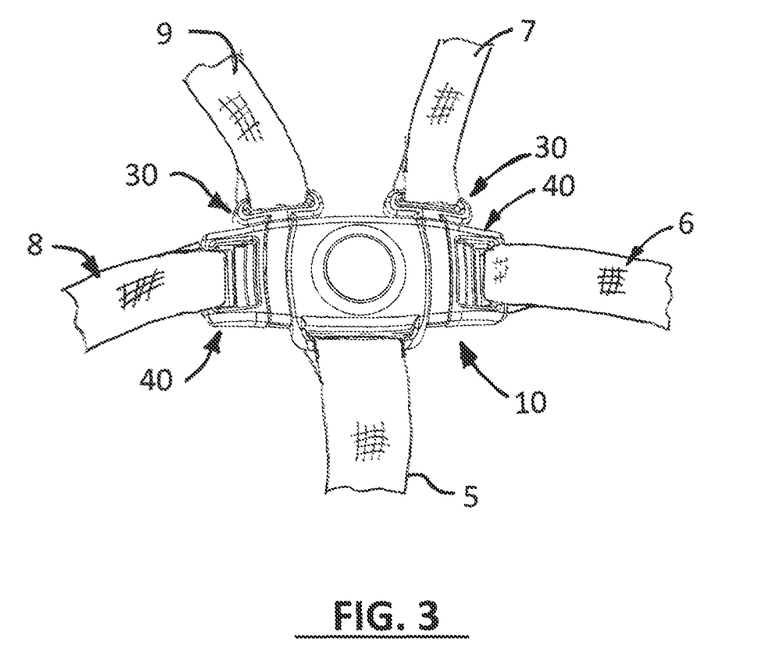
FIG. 3 is a illustrates a typical belt connection arrangement of the buckle of FIG. 1 in a child safety seat.
Figure 4:
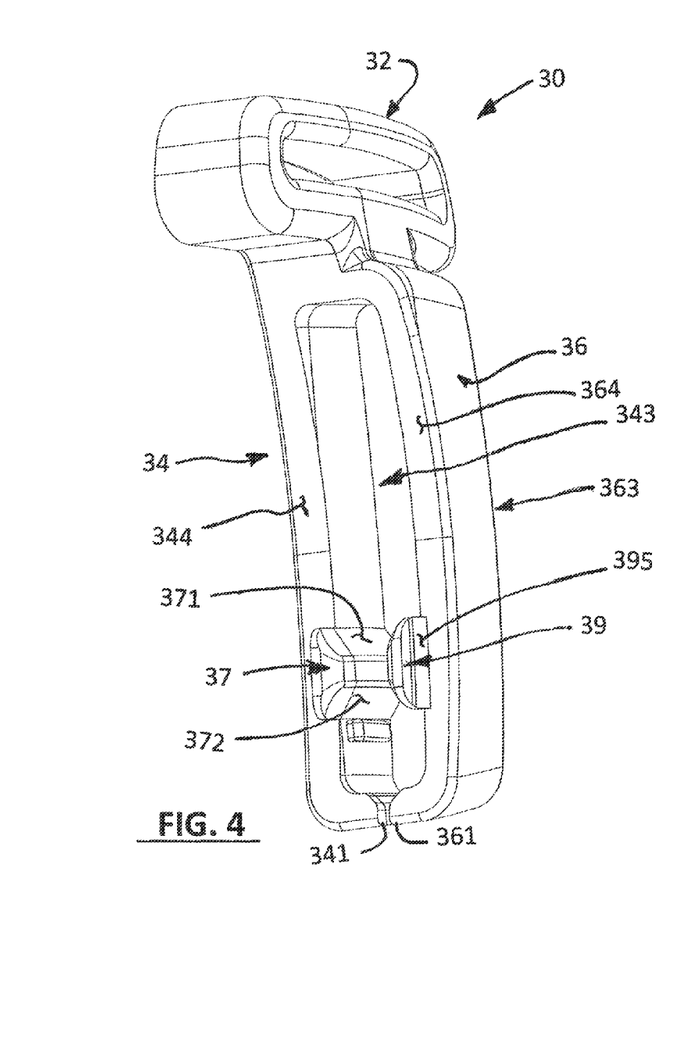
FIG. 4 is a first embodiment of a shoulder belt connection loop of the present invention.
Figure 5:
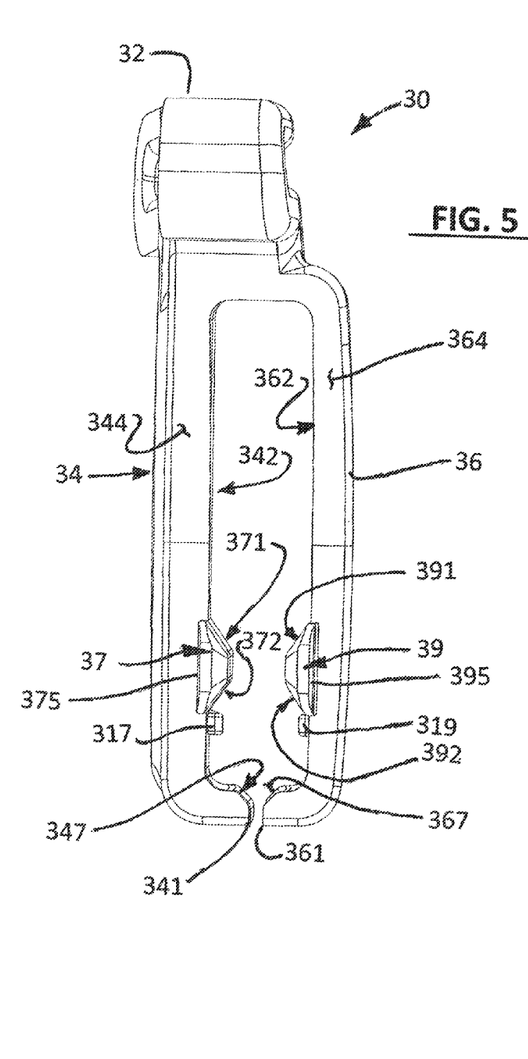
FIG. 5 is an alternate view of FIG. 4.
Figure 6:
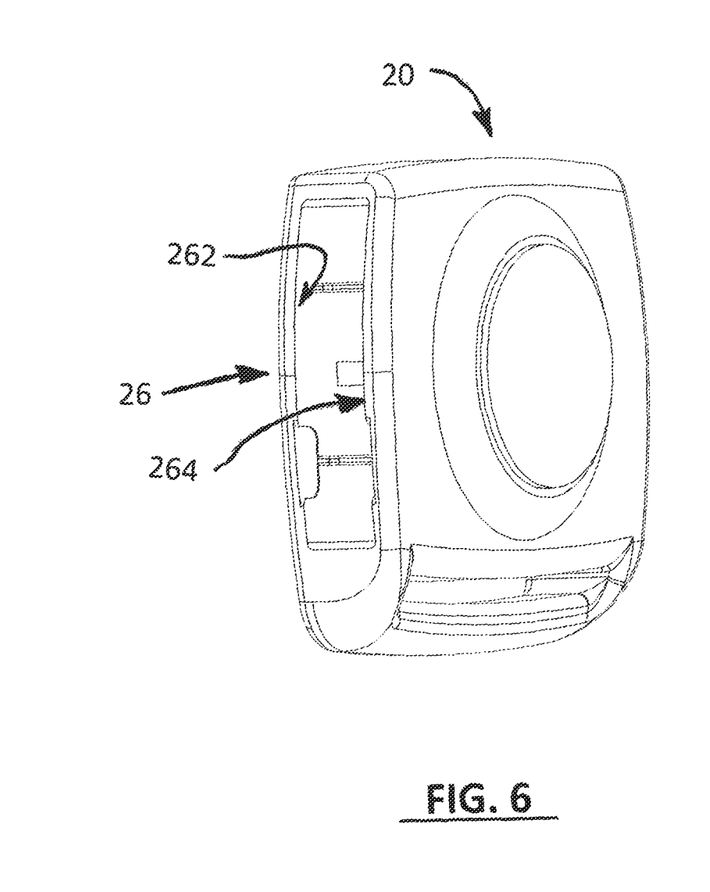
FIG. 6 is first view of a buckle body utilizing concepts of the present invention.
Figure 7:
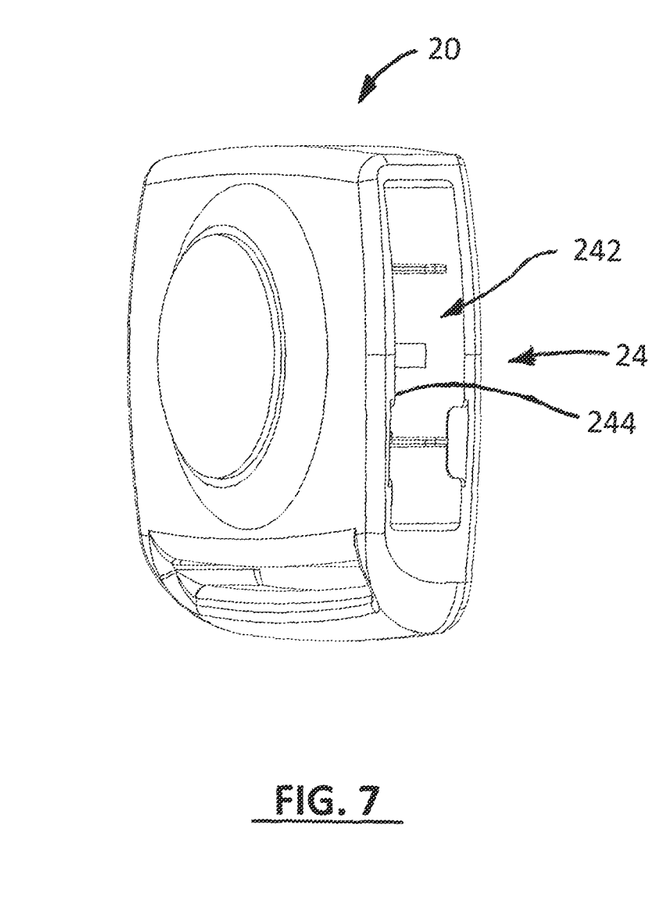
FIG. 7 is an alternate view of FIG. 6.

Referring to FIGS. 1 through 7, a buckle 10 for a five-point harness in a child's safety seat is illustrated for connecting a crotch strap 5, left and right side lap belts 6, 8, and left and right side shoulder belts 7, 9 to secure a child in the seat. The buckle 10 is shown fully connected as it would be with a child secured in the harness in FIG. 1 and with parts separated as would be necessary to release a child from the harness in FIG. 2. Buckle 10 comprises a buckle body 20 having a belt connector 22 and a pair of receptacles 24, 26 disposed on opposing lateral ends of the body. The buckle body is preferably connected by the crotch strap 5 engaging belt connector 22 to the safety seat structure. The crotch belt is typically a fixed length. A latch mechanism having a release push-button 29 is provided in the buckle body 20 to releaseably engage a pair of male elements 40. Shoulder belt connectors 30 are engaged by the male elements 40 to allow connection of a proximal end of the left and right side shoulder belts 7, 9 to the buckle 10.

The male elements 40 comprise a base 42 and one or more tangs 44, 45 extending therefrom generally along an insertion axis 100 for the buckle. A latch tang 49 also extends generally along the insertion axis 100 and is preferably positioned between the first and second tangs 44, 45 in a co-planar manner. The latch tang 49 is engaged by the latch mechanism in the buckle body when the buckle is operably assembled to retain the male elements 40 in position. The male elements 40 also include a belt aperture 46 through which a proximal end of one of the left or right side lap belts 6, 8 is passed. The distal ends of the lap belts 6, 8 are connected to the safety seat. The belt aperture 46 includes provisions to allow the length of the lap belt between the safety seat and the male element 40 to be adjusted to enable the lap belts to snugly secure a child in the seat.

The shoulder belt connectors 30 comprise a base structure 32 having a loop opening 33 for receiving one of the shoulder belts 7, 9 which are, in turn, connected at an opposite end to the safety seat. A pair of legs 34, 36 extends from the base structure 32 away from, preferably generally perpendicularly away from the insertion axis (viewed when the buckle 10 is assembled). The distal ends 341, 361 are normally positioned in close proximity so that the interior surfaces of the legs 34, 36 define an opening through which the male element tangs 44, 45 may pass. Separation of the distal ends 341, 361 is less than the thickness of the tangs 44, 45 when the legs are in an unflexed position so that movement of the tangs 44, 45 in relation to the shoulder belt connectors is limited to axial movement along the insertion axis 100.

The shoulder belt connectors 30 are preferably retained in position on the male element tangs 44, 45 when the male elements 40 are not engaged with the buckle body 20 to simplify the steps necessary to secure a child in the safety seat with the harness. A pair of wedge-shaped interlocks 317, 319 is provided on the interior surfaces 342, 362 of the legs 34, 36 to engage a pair of retention ribs 47 disposed on one of the tangs 44, 45 to hold the shoulder belt connector 30 fixed axially on the male elements 40. As the legs 34, 36 are not connected at the distal ends 341, 361 slight flexure of the legs permits the shoulder belt connectors 30 to be moved axially along the insertion axis 100 into a retained position as the interlocks 317, 319 slide over the retention tabs 47. The slope of the wedge shape of the interlocks 317, 319 is arranged to force the legs 34, 36 outwardly as the shoulder belt connector 30 is moved axially toward the operable position wherein the outward faces 343, 363 of the legs are in adjacent contact with the male element base 42.

The shoulder belt connectors 30 are further retained in an engaged position on the male elements 40 when the male elements are engaged with the buckle body 20. Each shoulder belt connector leg 34, 36 includes an anti-spread tab 37, 39 extending from inward faces 344, 364 of the legs generally along the insertion axis 100. The tabs have a catch surface 375, 395 which is positioned inside of receptacles 24, 26 when the male elements 40 with the shoulder belt connectors 30 are operably connected to the buckle body. In that configuration, the catch surfaces 375, 395 are in adjacent contact with the side walls 242, 244, 262, 264 of the receptacles and thus prevent outward movement (flexure) of the legs 34, 36 and maintain the distal ends 341, 361 of the legs sufficiently close to prevent disengagement of the shoulder belt connectors 30 from the male elements 40 by tension forces applied to the loops 33 of the shoulder belt connectors 30 in a direction generally perpendicular to the insertion axis. As used herein, generally perpendicular encompasses tension forces on the shoulder belt connectors which are applied in directions other than along the insertion axis. The predominant forces are presumed to be tension forces acting on the loops 33 and may or may not be perpendicularly aligned to the insertion axis, but will apply a sufficient tension component normal to the insertion axis to disengage the shoulder belt connector legs 34, 36 from the respective tang.

As the male elements are disengaged from the buckle body 20, the catch surfaces 375, 395 are retracted from the receptacles 24, 26 so that they are no longer in adjacent contact with the receptacle side walls thereby allowing outward flexure of the legs 34, 36. The outward flexure increases the separation of the distal ends 341, 361 sufficiently to allow the tangs 44, 45 to pass between the distal ends as the shoulder belt connectors 30 are moved generally perpendicularly to the insertion axis. Upper ramped surfaces 371, 391 on the anti-spread tabs 37, 39 urge the legs 34, 36 apart as a tension force is applied to the shoulder strap in a first direction (upward, generally perpendicular to the insertion axis). Corresponding lower ramped surfaces 372, 392 similarly urge the legs outwardly as the shoulder belt connectors 30 are pushed into engagement with the tangs 44, 45 from the opposite direction. Angled surfaces 347, 367 provided adjacent to the distal ends 341, 361 also urge outward spreading of the legs 34, 36 as the tension force is applied to the shoulder strap in the first direction.

While the buckle has been described for use in a five-point harness for use in a child safety seat, the buckle may find utility in any child safety restraint application in which a break-away feature is required.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A buckle for connecting free ends of harness belts in a child safety seat comprising:
    a main body having a receptacle with an outer face;
    a lap belt connector having an elongate tang extending along an insertion axis from a base arranged generally perpendicular thereto, the tang being configured to be partially received by the receptacle by movement along the insertion axis toward the outer face; and
    a shoulder belt connector having a pair of flexible legs downwardly extending toward distal ends to form, when unflexed, an aperture through which the tang may be positioned to engage the shoulder belt connector on the lap belt connector, when flexed allowing the distal ends to be spaced apart and the tang to pass between the distal ends, each leg further having a retainer tab extending from the respective leg parallel to the insertion axis;
    the lap belt connector being insertable into the receptacle with the shoulder belt connector legs positioned around the tang and between the base and the outer face and in adjacent contact therewith causing the retainer tabs to extend into the receptacle and prevent the legs from flexing away from the tang and securing the shoulder belt connector to the lap belt connector, partially retracting the tang from the receptacle to withdraw the retainer tabs from the receptacle enabling the legs to be flexed and the tang to pass between the distal ends and so that the shoulder belt connector may be disengaged from the lap belt connector by movement non-parallel to the insertion axis.

2. The buckle of claim 1, wherein the tang further comprises at least one retainer tab adjacent to the base, and at least one leg further comprises an interlocking wedge with a stop face, the stop face engaging the at least one retainer tab when the shoulder belt connector is in adjacent contact with the base to inhibit movement of the shoulder belt connector away from the base along the insertion axis.

3. The buckle of claim 2, wherein the interlocking wedge engages the at least one retainer as the shoulder belt connector is moved along the insertion axis toward the base to flex the legs to flex the legs outwardly away from the tang until the stop face engages the at least one retainer and the legs return to an unflexed position.

4. The buckle of claim 2, wherein each retainer tab further includes an upwardly oriented first ramped surface to interact with the tang to flex the leg outwardly away from the tang when retainer tab is disengaged from the receptacle and the shoulder belt connector is moved generally upwardly perpendicularly to the insertion axis.

5. The buckle of claim 4, wherein each retainer tab further includes a downwardly oriented second ramped surface to interact with the tang to flex the leg outwardly away from the tang to allow the shoulder belt connector to be engaged on the tang when shoulder belt connector is moved generally downwardly perpendicularly to the insertion axis.

6. The buckle of claim 1, wherein the main body further comprises a locking mechanism to retain the tang in the receptacle and enable selective release of the tang.

7. The buckle of claim 1, further comprising a second receptacle, a second lap belt connector, and a second shoulder belt connector mirroring the receptacle, lap belt connector, and shoulder belt connector.

8. A buckle for connecting free ends of harness belts in a child safety seat, the seat having at least right and left lap belt ends, right and left shoulder belt end, and an anchor belt end, the buckle comprising:
    a main body connected to the anchor belt end and having right and left receptacles with right and left outer faces, respectively;
    right and left lap belt connectors attached to the right and left lap belt ends, respectively, each lap belt connector having an elongate tang laterally extending from a base along an insertion axis, each tang being partially disposed within a respective receptacle;
    right and left shoulder belt connectors connected to the right and left shoulder belt portions, respectively, each shoulder belt connector having a pair of flexible legs extending downwardly therefrom toward respective distal ends, the distal ends being spaced to prevent passage of a respective tang therebetween when the legs are unflexed, the unflexed legs defining an aperture through which the right and left tangs extend, respectively, the legs being positioned along the insertion axis between and in adjacent contact with a respective base and outer face, each leg further having a retainer tab extending therefrom and engaging a respective receptacle to limit leg flexure so that spacing between the distal ends prevents passage of a tang therebetween.

9. The buckle of claim 8, wherein each retainer tab further includes an upwardly oriented first ramped surface to interact with the respective tang to flex the legs outwardly away from the tang when retainer tabs are disengaged from the receptacles and the shoulder belt connectors are moved generally upwardly perpendicularly to the insertion axis.

10. The buckle of claim 9, wherein each tang further comprises at least one retainer tab adjacent to the base, and at least one leg further comprises an interlocking wedge with a stop face, the stop face engaging the at least one retainer tab when the respective shoulder belt connector is in adjacent contact with the respective base to inhibit movement of the respective shoulder belt connector away from the respective base along the insertion axis.

11. The buckle of claim 10, wherein each retainer tab further includes an upwardly oriented first ramped surface to interact with the respective tang to flex the legs outwardly away from the respective tang when retainer tab is disengaged from the respective receptacle and the respective shoulder belt connector is moved generally upwardly perpendicularly to the insertion axis.

12. The buckle of claim 11, wherein each retainer tab further includes a downwardly oriented second ramped surface to interact with the respective tang to flex the legs outwardly away from the respective tang to allow the respective shoulder belt connector to be engaged on the respective tang when respective shoulder belt connector is moved generally downwardly perpendicularly to the insertion axis.

13. The buckle of claim 8, wherein the main body further comprises a locking mechanism to retain the tang in the receptacle and enable selective release of the tang.

14. A method for connecting free ends of harness belts in a child safety seat to secure a child therein, the method comprising the steps of:
   providing at least right and left lap belt ends, right and left shoulder belt end, and an anchor belt end;
   providing a main body connected to the anchor belt end and having right and left receptacles, each receptacle having an outer face;
   providing right and left lap belt connectors attached to the right and left lap belt ends, respectively, each lap belt connector having an elongate tang laterally extending from a base along an insertion axis, each tang being configured to be partially received by a respective receptacle by movement along the insertion axis toward the respective outer face;
   providing right and left shoulder belt connectors connected to the right and left shoulder belt portions, respectively, each shoulder belt connector having a pair of flexible legs extending downwardly therefrom toward respective distal ends to form, when unflexed, an aperture through which the respective tang may be positioned to engage the respective shoulder belt connector on the respective lap belt connector, the distal ends being spaced to prevent passage of a respective tang therebetween when the legs are unflexed;
   providing a retainer tab on each leg extending generally parallel to the insertion axis;
   positioning the right and left shoulder belt connectors so that right and left tangs, respectively, extend through the respective apertures, and the legs are in adjacent contact with the respective base of the right and left lap belt connectors; and
   inserting the right and left tangs into the right and left receptacles, respectively, until the respective legs of the right and left shoulder belt connectors are in adjacent contact with the right and left outer faces, respectively, and the retainer tabs are engaged in the respective receptacles to limit leg flexure so that spacing between the distal ends prevents passage of a tang therebetween.

15. The method of claim 14, further comprising the steps of:
   providing at least one retainer tab adjacent to the base on each tang; and
   providing an interlocking wedge with a stop face, on at least one leg of each shoulder belt connector, each stop face configured to engage the respective at least one retainer tab when the shoulder belt connector is in adjacent contact with the base to inhibit movement of the shoulder belt connector away from the base along the insertion axis.

16. The method of claim 15, further comprising the steps of:
   providing a locking mechanism on the main body to retain the right and left tangs in the right and left receptacles, respectively, the locking mechanism preventing disengagement of the tangs from the receptacles unless selectively released; and
   releasing the tangs from the receptacles by selective release of the locking mechanism.

* * * * *